United States Patent
Zeidler et al.

[15] 3,688,410
[45] Sept. 5, 1972

[54] MEASURING AND DISPLAY SYSTEM

[72] Inventors: Herman Rudolf Zeidler, Massapequa Park; Ronald M. Aurnou, Deer Park, both of N.Y.

[73] Assignee: Linear Motion Technology, Inc., Farmingdale, N.Y.

[22] Filed: April 15, 1970

[21] Appl. No.: 28,783

[30] Foreign Application Priority Data

Aug. 26, 1969 Great Britain..........42,375/69

[52] U.S. Cl. ..................................33/142, 33/125 M
[51] Int. Cl. ..............................................G01b 3/12
[58] Field of Search ....33/142, 125 M, 141 R, 141 B, 33/141 E, 141.5, 141

[56] References Cited

UNITED STATES PATENTS

| | | | |
|---|---|---|---|
| 3,449,833 | 6/1969 | Dzula | 33/125 M X |
| 2,663,598 | 12/1953 | Verderber | 33/141 R |
| 25,423 | 9/1859 | Lafever | 33/142 |
| 2,994,959 | 8/1961 | Thomas | 33/141.5 |
| 3,494,039 | 2/1970 | Porter | 33/142 |

FOREIGN PATENTS OR APPLICATIONS

| | | | |
|---|---|---|---|
| 557,069 | 11/1943 | Great Britain | 33/125 M |
| 139,185 | 2/1953 | Sweden | 33/125 M |

*Primary Examiner*—William D. Martin, Jr.
*Attorney*—Bauer & Amer

[57] ABSTRACT

Apparatus for measuring and displaying the amount and degree of movement of a movable element of a machine tool comprising a linear member and a rotatable member angularly disposed thereto and in surface engagement therewith. Either or both of the members is displaceable in correspondence with the movable machine element so as to cause rotation of the rotatable member by interaction of the surface engagement. The rotatable member is provided with means for producing a signal indicative of the incremental rotation thereof. The signal is fed to a display device whereon the degree of displacement from an initial position can be seen.

7 Claims, 11 Drawing Figures

INVENTORS
RONALD M. AURNOU
HERMAN R. ZEIDLER

BY Bauer & Amer

ATTORNEYS

INVENTORS
RONALD M. AURNOU
HERMAN R. ZEIDLER

BY *Bauer & Amer*

ATTORNEYS

INVENTORS
RONALD M. AURNOU
HERMAN R. ZEIDLER

BY
ATTORNEYS

MEASURING AND DISPLAY SYSTEM

The present invention relates to machine tool controls and in particular to apparatus for metering and displaying the amount or degree of movement of the movable element of said tools.

Machine tools such as planars, millers, lathes, etc., engage in a series of cyclical operations in which the movable element repeats its function on a successive number of work-pieces. It is of course preferred and most desirable that each work-piece be finished as close as possible in an identical manner with the others and, therefore, controls must be provided which enable the machine operator to obtain this result. However, as is well known, machine parts wear and erode after continuous use. The movable machine element warps, bends and also gets out of line so that after a short while errors creep into the repetitive operation. This is a particular troublesome problem in connection with the definition of the starting or reference point at which the machine may begin its cyclical operation.

Conventionally, the initial position or the fixed reference point of the movable element has been obtained by establishing a corresponding fixed initial position of the movable machine tool element with a defined point on the immovable portion of the machine. To this end the moving tool element itself, its lead or drive screw or some other portion of the movable portion of the machine has been employed. This technique is effective when the machine is new and properly adjusted; however, as soon as the slightest degree of wear occurs, the matching of the reference points is no longer truly indicative of the original and initial reference location.

It is, therefore, the object of the present invention to provide apparatus for the measuring and display of the amount and degree of machine tool movement overcoming the prior art drawbacks.

It is another object of the present invention to provide for the measuring and the display of the movement of the machine tool irrespective of a fixed reference point.

It is another object of the present invention to provide apparatus for displaying the movement of a machine tool in alpha-numeric logic.

It is a specific object of the present invention to provide apparatus which is free of the effects of wear, erosion or other distortions of the machine tool.

In summary, the present invention provides a measuring and display device for a machine tool comprising a linear member and a rotatable member angularly disposed thereto and in surface engagement therewith. Either the linear or rotatable member is displaceable in correspondence with the movable element of the machine tool so as to thereby cause rotation of the rotatable member by interaction of the surface engagement. The rotatable member is provided with means for producing a signal indicative of the incremental rotation thereof which signal is fed to a display device for visually displaying the degree of displacement from an initial starting point.

Further, in accordance with the present invention the linear member and the rotatable member are resiliently urged against each other so as to be maintained in continuous surface engagement and the rotatable member is provided with an annular disc having coding means capable of being sensed by a photoelectric cell. In one embodiment, the rotatable member, the coding means thereof and the photocell are mounted in common so as to be jointly movable. In other embodiments, the mounting of these elements is modified so that various arrangements of conjoint and non-joint movement are affected.

The full details of the present invention, its structure and its operation together with an illustration of the objects and advantages is contained in the following description which refers to the accompanying drawings in which.

Before turning to a full description of the present invention, it will be understood that it may be applied to a variety of machine tools and is not limited to any one in particular. However, for illustration purposes, the embodiment shown herein and described is particularly suitable for application to a milling machine having a table on which a work-piece is operated on. The table, as is well known, can either reciprocate, oscillate or otherwise move within a defined plane and may be placed in repetitive motion by the machine operator or automatically by suitable control means. A milling machine also has a second movable member comprising the cutter or other operative tool which may be movable in an axis or in a plane angular to the table. As illustrated the present invention may be applied to either the table or to the cutter of the milling machine, as will be easily and obviously understood by anyone skilled in this art. The milling machine, table, cutter and other drive operative means are not shown or described any further in the present description since these are well known and their structure and function, if elaborated on herein, will only be redundant and repetitious of the information freely available.

Figure 1:
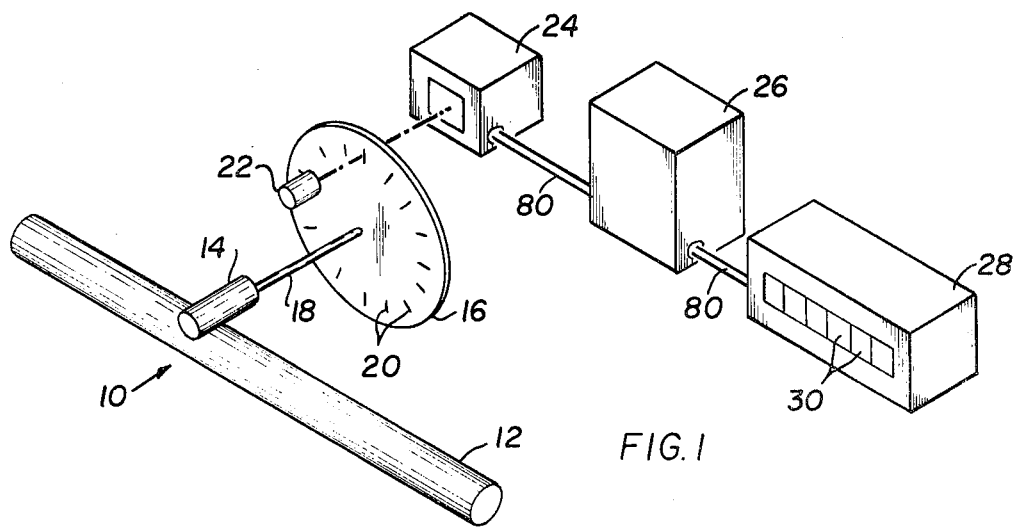
FIG. 1 is a schematic perspective view of the metering and display device of the present invention.

Referring now to FIG. 1 of the drawings, the numeral 10 generally identifies the combined measuring and display device which comprises a measuring rod or suitable linear member 12 that is adapted to be fixedly mounted to a part of a machine with which the present invention is adapted to operate, as for example the table of a milling machine. While the axis at which the rod 12 is mounted is not critical, it will be appreciated that it is to be secured to the moving machine element so as to be displaced correspondingly with it. The rod 12 is of a hardened material that is precision ground and accurately engages a metering roller 14. In the diagrammatic representation shown in FIG. 1, the metering roller 14 is connected in a one to one direct drive ratio with a rotatable disc 16. The connection 18 between the metering roller 14 and disc 16 may be a solid drive shaft or a flexible connection, depending upon the relative locations and positioning of the respective members.

The disc 16 is provided with a series of coding means that may be in the form of calibrations, slots or indices 20 thereon which are rotatively moved relative to and for sensing by an encoder structure comprising a light source 22 and a photo pick-up 24 that is responsive to the sensing of the relatively moving coding means 20. Each movement of the coding means 20 relative to the combined photo pick-up 22, 24 produces an electrical signal or pulse that is received by a multiplier and pulse shaping amplifier apparatus of conventional construction identified by the numeral 26. The shaper and amplifier shapes and amplifies and, in turn, imparts the information signal or pulse to a digital counter 28 containing a plurality of display windows 30 in which the precise measurement information may be displayed to the machine operator.

Figure 2:
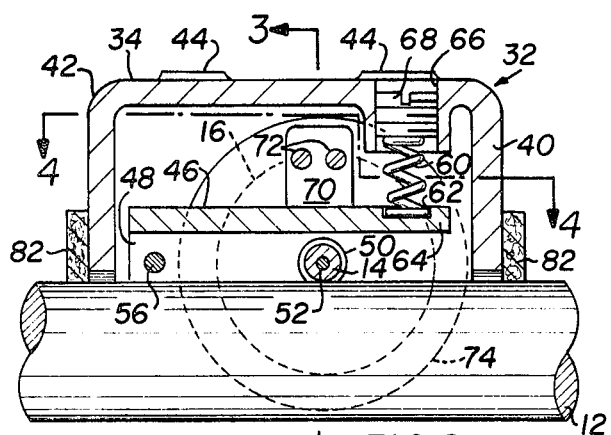
FIG. 2 is a cross-sectional view of the measuring portion of the apparatus of FIG. 1 taken along lines 2—2 of FIG. 3.
Figure 3:
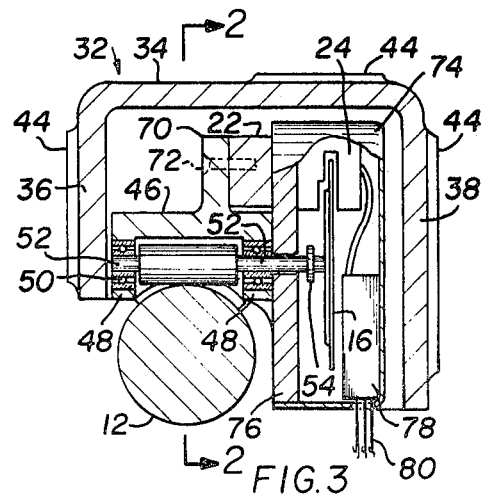
FIG. 3 is a sectional view taken along lines 3—3 of FIG. 2.
Figure 4:
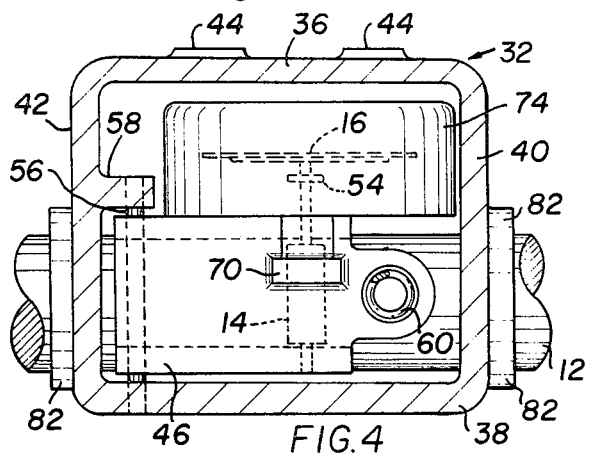
FIG. 4 is a sectional view taken along lines 4—4 of FIG. 2.

Referring now to FIGS. 2, 3 and 4 wherein the measuring and display device is illustrated in working operation, the linear measuring member 12 is adapted to be mounted by conventional means on any convenient surface of a machine or other apparatus with which the present invention is intended to be utilized. As noted previously, the rod 12 may be positioned in any desired axis. Generally, it is the practice to position the rod along that part of the machine which is to move or to be moved relative to another portion or part of the same machine and with the axis of the rod substantially parallel to the direction of movement. In this regard, the metering roller 14 that is adapted to engage and have movement relative to the measuring rod 12 may be positioned on another part of the machine and in an arrangement angular to the axis of the rod 12 so that movement of the rod in a linear direction causes rotation of the metering roller 14 about its own axis. It is possible that the rod 12 may be placed upon one part of the machine while the metering roller 14 may be mounted on another part of the machine by mere conventional rearrangement of the parts. It is entirely possible that either one of rod 12 or metering roller 14 may be stationary while the other may be relatively movable or both may be mounted on movable parts of the machine for displacement relative to each other.

With the rod 12 fixed to a moving part of the machine, the roller 14 is adapted to be mounted to another part of the machine by containing it within a housing generally identified by numeral 32. The housing 32 defines a substantial and almost complete enclosure for the parts associated with the metering roller. The housing 32 includes a rear wall 34, a top wall 36, a bottom wall 38 and end walls 40 and 42. Each of the rear, top and bottom walls 34, 36 and 38 respectively are provided with outward extensions or bosses 44 which may be provided with planar surfaces that are relatively smooth so as to enable the housing 32 to be conveniently mounted to a part of the machine by positioning it on such machine part at the respective surfaces 44.

Enclosed within the housing 32 is a pivot yoke or a housing member 46 that has spaced top and bottom arms 48 connected by the rear wall of the yoke. Each of the arms 48 is provided with a bearing structure 50 in which is mounted the narrowed shaft ends 52 of the metering roller 14.

The metering roller 14 is connected with the rotatable disc 16 by the extension of the lower shaft end 52 of the metering roller 14. The lower end of shaft 52 of the metering roller 14 may be directly connected with the disc 16 or it may be joined thereto by a coupling element 54. The coupling element 54 may be flexible in construction in the event the relative positions of the disc 16 and the metering roller 14 are out of axial alignment. In the embodiment of FIGS. 2–4, it has been found convenient to provide the coupling element 54 as a fixed mechanical connection between the lower end 52 of the metering roller 14 and the disc 16.

The yoke 46 carrying the metering roller 14 and the connected disc 16 is pivoted within and relative to the interior of the housing 32 and also relative to the measuring rod 12 at a pivot shaft 56 that is mounted transverse to the axis of the rod 12, at one end in the front wall 36 of the housing 32 and at its rear end in a lip extension 58, extending laterally inward from the end wall 42. The yoke member 46 is constantly biased in a direction to move the metering roller 14 for positive engagement with the measuring rod 12 by a coil spring 60. In this manner the metering roller 14 is held against the surface of the measuring rod 12, even though the measuring rod 12 may flex, bend, shift or otherwise move axially to its longitudinal axis or axis of operative movement.

The spring 60 is seated within a counter-bore 62 defined in a lateral extension 64 of the yoke. The opposite end of the spring 60 is seated and retained within a through hole 66 provided in the upper wall 36, as seen in FIG. 2. The hole 66 is closed by a threaded plug 68. Threaded adjustment of the plug 68 into and out of the hole 66 will result in varying the tension applied by the spring 60 against the yoke 46 and thus will enable a fine and precise adjustment of the pressure with which the metering roller 14 engages the measuring rod 12.

Fixed for conjoint movement with the yoke 46 is the photo pick-up and light sensing composite structure 24, 22. This is afforded by connecting the light and photo pick-up 22, 24 units to the yoke 46 on upwardly extending arm 70 defined at the rear face of the yoke. A pair of screws 72 are conveniently employed to connect such structures together for conjoint movement.

The light sensor and photo pick-up structure 22, 24 extends into and forms a part of a sub-assembly including sub-housing 74 that also is conveniently secured to and moves conjointly with the yoke 46. The sub-housing 74 is closed at its side by a plate 76 through which the bottom shaft 52 of the metering roller 14 projects. Enclosed within the sub-housing 74 is the rotatable disc 16 containing the coding means 20. The photo pick-up portion 24 is electrically connected with a connection box 78, also secured within the housing 74, that provides a plurality of leads 80 that transmit the signals or pulses generated by the scanning of the coding means 20 to the multiplier and pulse shaping amplifier 26 where they are further transmitted for digital display at the counter 28 in the windows 30, as seen in FIG. 1. A suitable source of electrical energy, not shown, is connected with the structure 22, 24, the pulse shaper and amplifier 26 and the counter display 28.

Provided on the end walls 40 and 42 of the housing 32 are wiper pads 82 that may be of any convenient material such as felt or other non-abrasive composition. Thus, if the housing 32 with its attendant structure is mounted on the immovable bed part of a milling machine and the measuring rod 12 is mounted on an adjacent facing side wall of the movable table, the metering roller 14 will rotate about one axis while engaging the measuring rod 12 positioned in a different axis. As the table of the milling machine is moved relative to the bed, the movement of the table is imparted to the measuring roller 14 which is consequently caused to rotate. During such relative movement of the table to the bed of the milling machine, the rod 12 is wiped clean by the wipers 82 while the disc 16 containing the coding means 20 is rotated in a one to one ratio with the metering roller 14 which is caused to rotate by virtue of its pressurized engagement with the relatively moving rod. As the coding disc 16 rotates within the sensing and photo pick-up structure 22, 24, the coding indices or calibrations 20 are incrementally sensed and thus transmitted as finite signals or pulses to the multiplier and pulse shaping amplifier 26 from which they are then transmitted for display at the windows 30 of the digital counter 28.

It will be recognized that the yoke 46 permits finite adjustment of the metering roller 14 for line engagement with the measuring rod 12 insuring continuous contact without excessive friction. Because of its pivotal movement in response to the precision adjustment of the spring 60 at the threaded plug 68, the yoke assures constant positive engagement between the metering roller and the rod and in consequence any relative movement between the rod 12 and the metering roller 14 is automatically translated to rotary motion of the metering roller. This rotary motion of the metering roller is then utilized to provide alpha or numeric information at the windows 30 of the counter display 28.

Those skilled in the art will realize that it is unimportant as to the axial position of the rod 12 or the metering roller 14. It is interesting to note that no matter what the position of the rod 12, the engagement thereof by the metering roller 14 produces an accurate encoding of information at the sensing and photo pick-up 22, 24 which may be ultimately utilized at the windows 30. In practice, when the present invention 10 is employed on a machine tool, as a milling machine, even though the operating lead screw which is utilized to move the table may be worn and have lost motion which would normally result in an erroneous repositioning of the table and the work-piece thereon with respect to a fixed reference or point, the performance of the present device will enable the operator to see the actual position of the work-piece on the table with respect to such fixed or reference point. Thus, reliance upon the operating lead screw is no longer necessary.

The digital counter 28, is of conventional form, displaying a successive array of indicia in the windows 30 on the successive impression of pulses from the shaper 26. The shaper 26 is also of conventional design being capable of providing a digital pulse (positive or negative) depending on the direction of movement of the coding disc 16, (i.e. the measuring rod 12) so that the ultimate indication on the digital display is the sum or is the actual indication of the extent or degree of movement of the machine tool. Further, the shaper 26 or the digital counter 28 may be provided with reset means or signal erace means so that the counter can be originated at a zero position. These devices are well known in the electronic computer and calculator art and consequently need not be further described here.

The device is placed in operation merely by having the operator set the counter 28 at a fixed position, such as the reset position, or observe the initial readout in the windows 30, when the machine is at rest. In any event, the readout provides the operator with a fixed reference point, or starting point, for the machine, since any change in the indicia of the counter necessarily indicates a corresponding change in the position of the measuring rod 12. The machine is then operated through its cycle. Thereafter, the operator merely sets the machine so that the indicia in windows 30 corresponds to the original readout.

Accordingly, the use of unskilled machine operators is made possible by the present invention. All that is necessary is that the operator of the machine watch the alpha or numeric information displayed at the windows 30 to see and assure himself that he has positioned or repositioned the work-piece at the desired location with respect to the preselected fixed reference or point as is displayed in the windows 30. It is no longer necessary to teach a machine operator how to read the Vernier calibrations provided on the lead screw and the table nor is it necessary to worry that the backlash or wear in the operating lead screw of the machine has produced an erroneous positioning or repositioning of the table. When the operator reads the alpha or numeric information in the windows 30, he knows that if he started with a particular bit of information displayed in the windows and wishes to return the work-piece to the same measurement point or reference, the lead screw operating the table need merely be rotated until such time as the relative motion between the metering roller 14 and the measuring rod 12 causes the desired alpha and/or numeric measurement information to appear again in the windows 30. This arrangement of structure thus enables any fixed point or preselected point on the machine table to be positioned and repositioned and returned relative to another preselected fixed or reference point consistently and accurately, this without concern as to the inaccuracies or wear of the machine parts.

Figure 5:
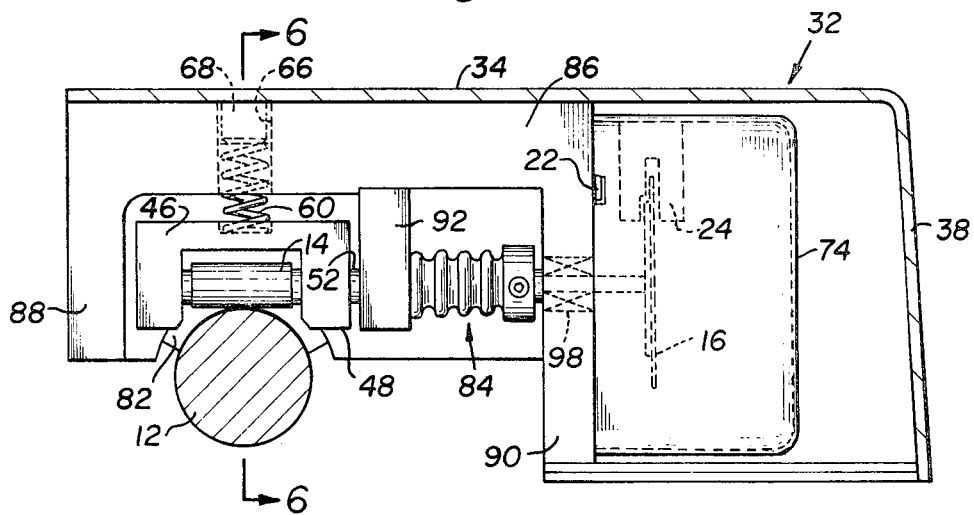
FIG. 5 is a sectional view similar to FIG. 3 showing a modification of the invention.
Figure 6:
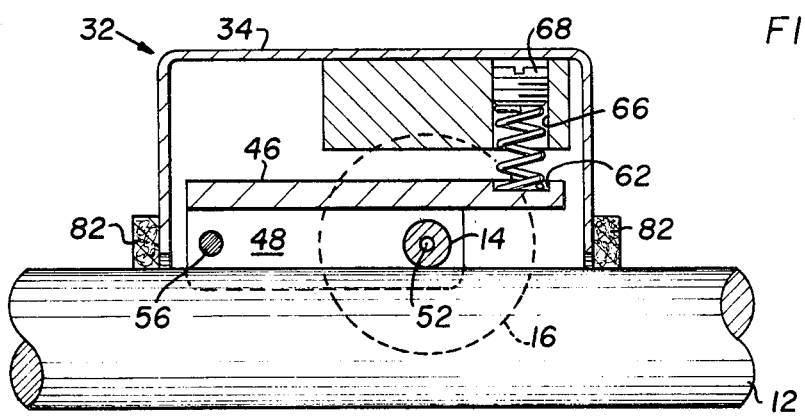
FIG. 6 is a sectional view similar to FIG. 2 showing the modification of FIG. 5 at a different angle.

In FIGS. 5 and 6 an embodiment is shown in which the aforementioned flexible coupling is employed. In these figures, all parts, like those shown in FIGS. 1–4, are given like reference numerals and function in a like manner except where otherwise specifically noted. The flexible coupling, shown in FIGS. 5 and 6, is given the general numeral 84 and may be used when the axis of the metering roller 14 and the axis of the scanning disc 16 are not necessarily aligned or wherein freedom of movement between the disc 16 and its associated photocell sensing means 22 is desired. It may also be used when the yoke 46 is mounted independently and separately pivotable from the sub-housing 74.

As seen in FIGS. 5 and 6, the interior of the outer housing 32 is provided with a relatively thick contoured lining 86 having a top wall 88, a lower wall 90 and an intermediate wall 92. The shaft 52 of the metering roller 14 extends through the intermediate wall 92 and connects with a coupling 84 as its input shaft. The coupling 84 has an output shaft 94 which extends through the wall 90 of the lining 86 and has an extension 96 forming the axle of the disc 16. The output shaft 94 is secured in a bearing 98 within the rear wall 90 so as to be maintained against any movement or vibration. The light source 22 is mounted within the wall 90 while the sub-housing 74 is conventionally secured to the wall 90. The adjustment screw 68 and spring 60 holding the yoke 46 is provided in a through bore extending through the lining 86, as will be obvious. On the other hand, the sub-housing 74 may be secured not to the yoke 46 but may be secured to the outer housing 32.

The coupling 84 is conventional in nature and is adapted to flexibly connect the two linear rotatable shafts of the metering roller and the disc, for conjoint movement while the same shafts may be movable or angularly adjustable relative to each other. The exact nature of the coupling is not shown since a number of such devices are readily available and are also well known to those skilled in the present art. It will be obvious, however, that the coding disc 16 and the sensing device may be thus positioned slightly askew of the axis of the roller meter so that advantage might be taken of spatial or other operating conditions which might limit the inline arrangement described in connection with FIGS. 1-4. Further, the flexible coupling permits the yoke 46 and the metering roller 14 to be pivoted independently of the disc 16 and its associated light and photocell sources.

Figure 7:
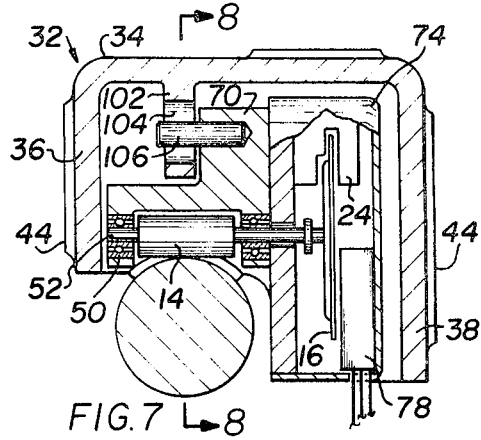
FIGS. 7–9 are sectional views similar to those above showing still another embodiment of the present invention.
Figure 8:
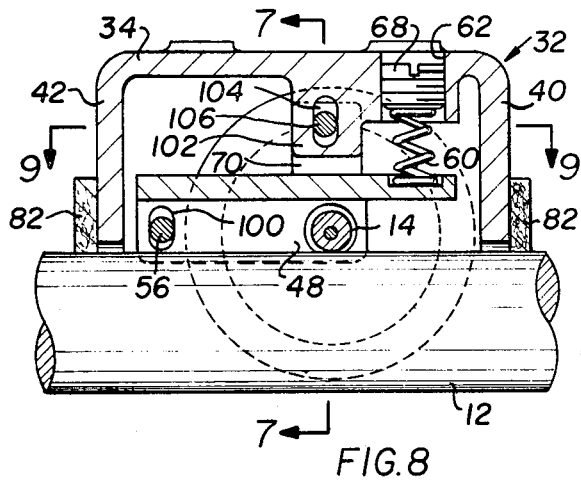
Figure 9:
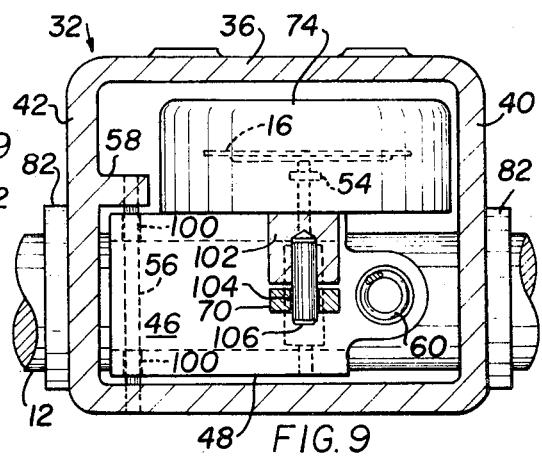

In the embodiment shown in FIGS. 7-9, the apparatus is designed to be utilized on a machine tool which, for example, vibrates excessively or has some large degree of movement angular to the linear direction of the measuring rod 12. Notwithstanding the special application, the device as shown in FIGS. 7-9 can obviously function anywhere that the previously described embodiments will.

Again, like parts are given like numbers and function in like manner as do those parts previously described. In this embodiment, however, the pivot pin 56 for holding the yoke 46 is set in a slot 100 having a longitudinal axis normal to the linear direction of the member 12. Simultaneously, the wall 36 of the outer housing 32 is provided with a depending tab or boss 102 adjacent the arm 70 by which the yoke is connected to the sub-housing 74. The tab 102 is provided with a slot 104 having an axis normal to the linear axis of the member 12. A pin 106 is secured within the arm 70 and extends into the slot 104. In this manner, the yoke 46 and the sub-housing 74 carrying the disc and photocell coding device 22, 24 can be translated relative to the pins 56 and 106 and movable in the slots 100 and 104 so as to maintain the metering roller 14 in constant surface engagement along the tangential contacting portions of the engaging members. This arrangement delimits the possible rate of build-up of inaccuracies during the movement of the roller 14 relative to the measuring rod 12.

Figure 10:
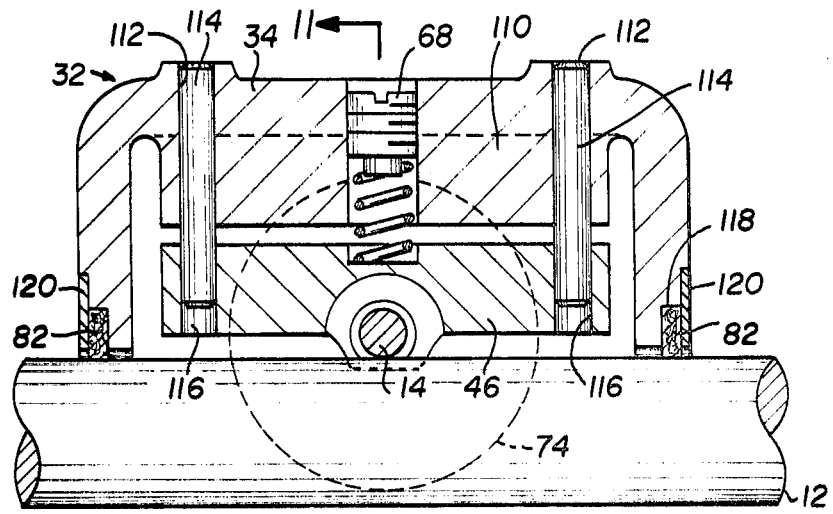
FIGS. 10–11 are sectional views also similar to those previously mentioned showing yet a third embodiment of the present invention.
Figure 11:
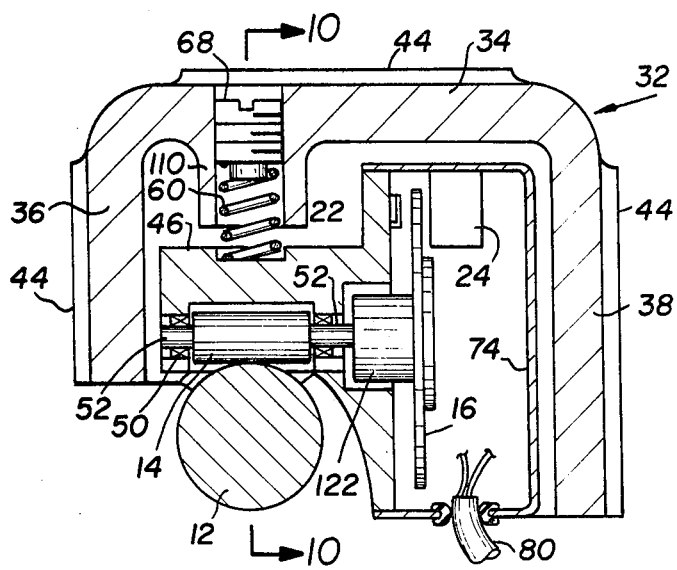

FIGS. 10 and 11 show still another embodiment which accomplishes the same purpose as that of the embodiment shown in FIGS. 7-9. In this case, the yoke 46 carrying the metering roller substantially along its central axis transverse to the longitudinal axis of the measuring rod 12 is substantially balanced in see-saw manner. The adjustable pressure spring means 60 is located at the center of the yoke 46 and bears directly above the axis of the metering roller 14 so that the yoke carries and urges the roller directly against the rod 12. Otherwise, the yoke 46 is substantially free floating above the measuring rod 12. The housing 32 is provided with a relatively thick lining 110 through which are provided a pair of bores 112, in each of which are secured a pin 114. Each of the pins 114 slidingly fit within a bore 116 formed respectively at the forward and aft ends of the yoke 46. The free floating yoke 46 is thus relatively floatable above the rod 12 and is urged thereagainst by the action of the adjustable spring 60 so that should any movement of the measuring rod 12 occur, a corresponding and direct movement of the metering roller 14 would be accomplished.

To illustrate the versatility of the present invention, other changes in the form of the apparatus are shown in FIGS. 10 and 11. It will be first noticed that the wiper pads 82 are set in notches 118 formed within the walls of the housing 32 and are retained by a plate 120 secured over them. The wiper pads 82 may thus be made of extremely inexpensive material, such as cotton wadding instead of felting and yet be secured on the housing 32 for a long and effective life. A second modification is illustrated in FIGS. 10 and 11 dealing with the coupling of the disc 16 to the shaft 52 of the metering roller 14. Here, the coupling depicted generally by the numeral 122 may be made as a variable speed clutch or reduction gear system or similar coupling device so that the disc and the shaft rotate at ratios greater or lesser than the one to one ratio previously described. In this connection, the incremental movement of the scanning disc 16 may be more closely calibrated to obtain the digital display in more finite and precise terms.

It will thus be obvious that the present invention provides a simple and economical device whereby the movement of a machine tool element may be measured and visually displayed with respect to a reference point which is independent of the machine tool element itself. The reference point in the present apparatus being the digital counting device itself which may be preset and prefixed no matter what the initial starting point of the movable element is. Thus, the present apparatus eliminates any distortion which may occur from the wear or other inaccuracies inherent in the machine tool element.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. The system for measuring and displaying the movement of a linearly movable element comprising a measuring member and a rotatable member angularly disposed thereto and in surface contact therewith, one of said measuring and rotatable members being displaceable conjointly with the movable element causing simultaneous rotation of said rotatable member, rotatable coding means flexibly coupled with said rotatable member for rotation thereby and producing a signal indicative of the rotation thereof, a display device for visually displaying said signal, a movable support for said rotatable member to move the same into surface contact with said measuring member, means housing said coding means separate from said rotatable member, and adjustable biasing means acting on said movable support to adjust the extent of frictional surface contact between said rotatable and measuring members, said movable support being movable on said housing toward and from said measuring member, and means housing said coding means in a stationary position while said rotatable means moves with said movable support.

2. Apparatus for metering the movement of a movable element comprising a measuring member fixedly mounted for simultaneous displacement with the movable element, a metering roller rotatable about its central axis, a yoke movable toward and away from said measuring member, said metering roller being mounted in said yoke and movable with respect to and in engagement with said measuring member, spring means acting directly on said yoke to bias said metering roller into engagement with said measuring member, adjusting means to adjust the tension of said spring means acting on said yoke, a fixed housing containing an annular disc fixed with respect to said housing and operatively flexibly connected to and for conjoint rotation with said shaft, said metering roller rotatively coupled with said disc, said disc having a plurality of uniformly spaced apertures annularly arranged therein and a photoelectric sensor arranged to receive light passing through said apertures as said disc rotates, said sensor producing a signal responsive to the movement of said disc, and means for visually displaying said signal.

3. Apparatus for measuring the displacement of a movable element comprising a measuring member fixedly mounted for simultaneous displacement with the movable element, a housing fixedly mounted with respect to the movable element, a yoke pivotally mounted within said housing about an axle extending transversely to said measuring member, a metering roller rotatable about its central axis mounted within and for movement with said yoke, spring means acting on said yoke to bias said metering roller into engagement with said measuring member, adjusting means to vary the tension of said spring means, said metering roller having an axial shaft extending therefrom, a disc flexibly coupled with and rotatable by said shaft, said disc having a plurality of apertures located therein, a sub-housing surrounding said disc, a light source and a photocell mounted within said sub-housing on opposite sides of said disc said apertures creating in said photocell an incremental series of signals indicative of the rotation of the said disc, said disc being fixed in relation to said light source while rotatable relative to said light source, and visual display means responsive to said signals for indicating the incremental movement.

4. The apparatus according to claim 3,
wherein said sub-housing is secured to said outer housing against movement.

5. The apparatus according to claim 3,
said adjusting means for varying the tension of said spring means being on said housing and acting directly on said spring means.

6. A system for metering and measuring the movement of a movable element comprising a first housing member movable toward and away from said movable element and having a roller follower adapted to engage the movable element and rotatable in correspondence with relative movement therebetween, a second housing member having coding means rotatable about a fixed axis coupling means flexibly connecting the roller follower and said coding means for conjoint rotation irrespective of the movement of the first housing and roller follower, thereby the relative movement of said roller follower and movable element is translated into an electrical signal, and means directly biasing said first housing member for movement to urge said roller follower against said movable element.

7. The apparatus according to claim 6,
wherein said second housing member is fixed while said first housing member moves toward and away from said movable element and said flexible coupling means enables the roller follower and coding means to rotate at the same ratio while said coding means remains fixed but rotatable with respect to said sensing means.

* * * * *